United States Patent
Liu

(10) Patent No.: US 8,995,827 B2
(45) Date of Patent: Mar. 31, 2015

(54) SYSTEM AND METHOD FOR FINDING PARTIALLY DISJOINT PATHS FOR SPARE CAPACITY ALLOCATION IN SHARED BACKUP PATH PROTECTION FOR DUAL FIBER CUTS

(71) Applicant: FutureWei Technologies, Inc., Plano, TX (US)

(72) Inventor: Victor Yu Liu, Oakland, CA (US)

(73) Assignee: Futurewei Technologies, Inc., Plano, TX (US)

(*) Notice: Subject to any disclaimer, the term of this patent is extended or adjusted under 35 U.S.C. 154(b) by 201 days.

(21) Appl. No.: 13/791,427

(22) Filed: Mar. 8, 2013

(65) Prior Publication Data

US 2014/0169159 A1   Jun. 19, 2014

Related U.S. Application Data

(60) Provisional application No. 61/738,263, filed on Dec. 17, 2012.

(51) Int. Cl.
  *H04B 10/00*  (2013.01)
  *H04L 12/24*  (2006.01)
  *H04L 12/701*  (2013.01)
(52) U.S. Cl.
  CPC ............ *H04L 41/0659* (2013.01); *H04L 45/00* (2013.01)
  USPC .................................. 398/5; 398/17; 398/140
(58) Field of Classification Search
  USPC ................................................. 398/1–8, 140
  See application file for complete search history.

(56) References Cited

U.S. PATENT DOCUMENTS

| | | | |
|---|---|---|---|
| 6,744,727 B2 | 6/2004 | Liu et al. | |
| 7,398,321 B2* | 7/2008 | Qiao et al. | ..................... 709/239 |
| 7,451,340 B2* | 11/2008 | Doshi et al. | ................... 714/47.2 |
| 8,345,538 B2* | 1/2013 | Hashiguchi et al. | ........... 370/217 |
| 8,842,984 B2* | 9/2014 | Akyamac et al. | ................ 398/17 |

(Continued)

FOREIGN PATENT DOCUMENTS

| | | |
|---|---|---|
| CN | 101145930 A | 3/2008 |
| EP | 1473887 A2 | 11/2004 |

OTHER PUBLICATIONS

Liu et al., "Approximating optimal spare capacity allocation by successive survivable routing," in Proceeding of IEEE INFOCOM, Anchorage, AL, Apr. 24-28 2001, pp. 699-708.

(Continued)

*Primary Examiner* — Agustin Bello
(74) *Attorney, Agent, or Firm* — Slater & Matsil, L.L.P.

(57) ABSTRACT

System and method embodiments are provided herein to obtain minimum or optimal spare capacity allocation (SCA) using partial disjoint paths (PDP) for bi-connected network topology. Both an integer linear programming (ILP) optimization model and an approximation algorithm, referred to herein as Successive Survivable Routing (SSR), are formulated for resolving the SCA with PDP. The embodiments include assigning a working path and a primary backup path on two disjoint routes between two end nodes, and assigning a plurality of secondary backup paths that are partially disjoint and that each pass through one fiber cut group on one of the two disjoint routes and all remaining fiber cut groups on the other one of the two disjoint routes. Each of the fiber cut groups includes all fiber cut pairs on both disjoint routes that have the same effect of interrupting a flow on both disjoint routes.

20 Claims, 5 Drawing Sheets

(56) References Cited

U.S. PATENT DOCUMENTS

| | | | |
|---|---|---|---|
| 2002/0097680 A1* | 7/2002 | Liu et al. | 370/238 |
| 2003/0063613 A1* | 4/2003 | Carpini et al. | 370/401 |
| 2004/0218525 A1* | 11/2004 | Elie-Dit-Cosaque et al. | 370/223 |
| 2012/0281524 A1* | 11/2012 | Farkas | 370/221 |
| 2012/0301140 A1* | 11/2012 | Zhang et al. | 398/45 |
| 2014/0119172 A1* | 5/2014 | Liu et al. | 370/218 |
| 2014/0169159 A1* | 6/2014 | Liu | 370/228 |
| 2014/0185432 A1* | 7/2014 | Liu | 370/228 |

OTHER PUBLICATIONS

Liu et al., "Approximating optimal spare capacity allocation by successive survivable routing," IEEE/ACM Transactions on Networking, vol. 13, No. 1, pp. 198-211, Feb. 2005.

Liu et al., "Spare capacity allocation in two-layer networks," IEEE Journal on Selected Areas in Communications, vol. 25, No. 5, pp. 974-986, Jun. 2007.

Liu et al., "Spare Capacity Allocation Using Shared Backup Path Protection with Partially Disjoint Paths for Dual Fiber-Cuts Protection," Extended Summary in 2012 INFORMS Telecommunications Conference, Boca Raton, Florida, USA, Mar. 15-17, 2012.

Liu et al., "Spare Capacity Allocation Using Partially Disjoint Paths for Dual Link Failure Protection," In 9th International Workshop on the Design of Reliable Communication Networks (DRCN), Budapest, Hungary, pp. 171-178, Mar. 4-7, 2013.

Liu et al., "Finding partially disjoint routes for dual fiber-cut protection on bi-connected networks," in: Optical Fiber Communication Conference and National Fiber Optic Engineers Conference (OFC/NFOEC), Los Angeles, California, USA, Mar. 4-8, 2012.

Liu et al., "Spare capacity allocation for non-linear cost and failure-dependent path restoration," in: Third International Workshop on Design of Reliable Communication Networks (DRCN), Hungary, Budapest, Oct. 7-10, 2001, pp. 699-708.

Liu et al., "Spare capacity allocation using shared backup path protection for dual link failures," in: Eighth International Workshop on the Design of Reliable Communication Networks (DRCN), Krakow, Poland, Oct. 2011.

Liu et al., "Spare capacity allocation using shared backup path protection for dual link failures," in Computer Communications, Special Issue on Reliable Network Services, online at http://dx.doi.org/10.1016/j.comcom.2012.09.007, Sep. 2012.

Liu, "Spare capacity allocation: model, analysis and algorithm," Ph.D. dissertation, School of Information Sciences, University of Pittsburgh, USA, Oct. 2001.

International Search Report received in PCT/CN2013/087931, mailed Feb. 6, 2014, 14 pages.

Tsin, "Yet another optimal algorithm for 3-edge-connectivity," Journal of Discrete Algorithms, vol. 7, pp. 130-146, Dec. 2009.

* cited by examiner

SYSTEM AND METHOD FOR FINDING PARTIALLY DISJOINT PATHS FOR SPARE CAPACITY ALLOCATION IN SHARED BACKUP PATH PROTECTION FOR DUAL FIBER CUTS

This application claims the benefit of U.S. Provisional Patent Application Ser. No. 61/738,263, filed on Dec. 17, 2012, and entitled "Spare Capacity Allocation Using Partially Disjoint Paths for Dual Link Failure Protection," which application is incorporated herein by reference.

TECHNICAL FIELD

The present invention relates generally to a system and method for improving spare capacity allocation for network communications, in particular embodiments, to a system and method for finding partially disjoint paths for spare capacity allocation in shared backup path protection for dual fiber cuts.

BACKGROUND

Modern communications networks are comprised of nodes that transport data through the network via links that connect the nodes. The nodes may include routers, switches, bridges, or combinations thereof that transport the individual data packets or frames through the network over links between the nodes. The data packets may be forwarded on pre-established paths that include nodes and links. Different path protection schemes may be used to protect link or node failures on a path and avoid substantial data loss. Some path protection schemes handle single link failures, where a working path is assigned a backup path that is reserved in case of failures in the working path. Other more stringent schemes may be needed to handle dual link failures, where the working path is assigned a primary backup path that is reserved in case of failures in the working path, and a secondary backup path that is reserved in case of additional failures in the primary backup path. In some cases, at least some portions of the backup paths may share some network resource capacity (e.g., bandwidth) to save resources/cost in the network. Further, the backup paths may not be completely disjoints. When setting up such partially disjoint back up paths for link/path failures, there is a need for a scheme that efficiently allocates shared resources between the paths, also referred to as spare capacity allocation.

SUMMARY OF THE INVENTION

In accordance with an embodiment, a method implemented by an apparatus for allocating shared spare resource capacity for a plurality of flows on partial disjoint paths (PDP) includes, for each of the flows, finding a working path and a primary backup path that are mutually disjoint between a source node and a terminal node of the flow that are connected via two disjoint routes. The disjoint routes include a plurality of nodes, links, and fiber cuts. The method further includes finding a plurality of secondary backup paths that are partially disjoint and protect each fiber cut group along the two disjoint routes. Each of the fiber cut groups includes all fiber cut pairs on both disjoint routes that have the same effect of interrupting the flow on both disjoint routes. The shared spare resource capacity for the working path, the primary backup path, and the partially disjoint secondary backup paths are then aggregated for all the flows.

In accordance with another embodiment, a method implemented by an apparatus for allocating shared spare resource capacity for a flow includes assigning a working path and a primary backup path on two disjoint routes between two end nodes. The method further includes assigning a plurality of secondary backup paths that are partially disjoint and that each pass through one fiber cut group on one of the two disjoint routes and all remaining fiber cut groups on the other one of the two disjoint routes. Each of the fiber cut groups includes all fiber cut pairs on both disjoint routes that have the same effect of interrupting a flow on both disjoint routes.

In yet another embodiment, an apparatus for allocating shared spare resource capacity for a flow on two disjoint routes between two end nodes includes a processor and a computer readable storage medium storing programming for execution by the processor. The programming includes instructions to assign to the flow a working path on one of the two disjoint routes and a primary backup path on the other one of the two disjoint routes. The programming further includes instructions to assign a plurality of partially disjoint backup paths to the flow that each passes through one fiber cut group on one of the two disjoint routes and through all remaining fiber cut groups on the other one of the two disjoint routes. Each of the fiber cut groups includes all dual link failures that interrupt the flow on both disjoint routes.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

A shared backup path protection (SBPP) scheme can be used to protect against dual link failures by pre-planning each traffic flow with mutually disjoint working and two backup paths while minimizing the network overbuild. This scheme requires the network topology to be tri-connected, where there are three disjoint paths that connect between the same two nodes. However, many existing backbone networks are bi-connected with two instead of three fully disjoint paths between node pairs. In practice, partially disjoint paths (PDP) have been used for backup paths instead of fully disjoint paths. System and method embodiments are provided herein to obtain minimum or optimal spare capacity allocation (SCA) using PDP for bi-connected network topology. This is achieved by extending a spare provision matrix (SPM) computation model for SCA to consider PDP for different fiber cuts, as described below. An integer linear programming (ILP) optimization model is formulated for resolving the SCA. Further, an approximation algorithm for SCA with PDP, referred to herein as Successive Survivable Routing (SSR), is presented.

Figure 1:
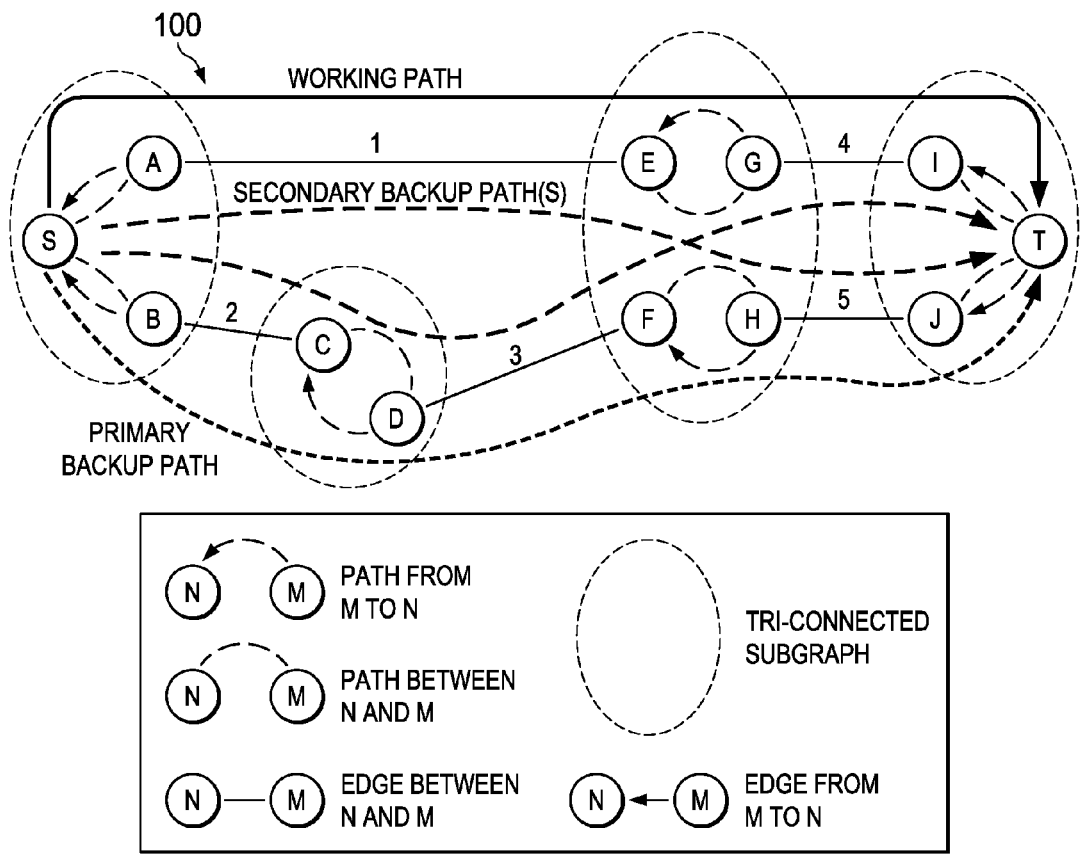
FIG. 1 illustrates a bi-connected network topology including two disjoint paths for a flow and additional partially disjoint paths.

On a bi-connected network, a flow (e.g., a data stream) may have two mutually disjoint paths to protect against any dual link failures. This may be the case when the source and destination nodes of a flow are separated by a set of fiber cuts that only contain two fibers or links. Such cuts are referred to herein as cut-pairs. FIG. 1 shows a bi-connected network topology 100 that includes two disjoint paths and additional partially disjoint paths for a flow between two end nodes (s and t). The two disjoint paths and the additional partially disjoint paths can be found using a max flow based algorithm, as described by V. Y. Liu, et al. (Liu) in "Finding partially disjoint routes for dual fiber cut protection in bi-connected networks," Optical fiber conference, 2012, which is incorporated herein by reference.

The two disjoint paths can be assigned as the working path and the primary backup path. The two disjoint paths also pass through a set of cut-pairs, which can be aggregated into cut-groups. The cut-pairs of this flow in the same cut-group share common links. For example, cut-pairs (1, 2) and (1, 3) can be put into the same cut-group (1, [2, 3]). Dual link failures containing common edge 1 and either 2 or 3 can have the same effect of interrupting both paths for the flow from the source to terminal end point (s→t). After the cut-groups are identified for the flow, multiple secondary backup paths can be found to cover various halves of these cut-groups using the max flow algorithm by Liu, et al. FIG. 1 includes an example of two secondary backup paths to protect two cut-groups. Using such algorithm, the resulting four paths (working path, primary backup paths, and two secondary backup paths) can protect all dual fiber cuts except the cut-pairs contained in the two cut-groups. Specifically, the two partially disjoint secondary backup paths in FIG. 1 are used to protect dual fiber cuts distributed over the working and primary backup paths. However, the dual fiber cuts may not be protected by a single secondary backup path alone. Each of these partially disjoint backup paths may only protect a subset of the dual fiber cuts.

This type of protection scenarios is similar to a SCA model based on failure dependent (FD) path protection against single link failures described by Y. Liu, et al. in U.S. Pat. No. 6,744,727, entitled "Apparatus and Method for Spare Capacity Allocation," Jun. 1, 2004, and in "Spare capacity allocation for non-linear cost and failure-dependent path restoration," Proceedings of the Third International Workshop on Design of Reliable Communication Networks (DRCN), 2001, both of which are incorporated herein by reference. The FD path protection based SCA model computes a set of primary backup paths for the working paths of a flow without a set of secondary backup paths, and therefore does not account for dual link failures.

Figure 2:
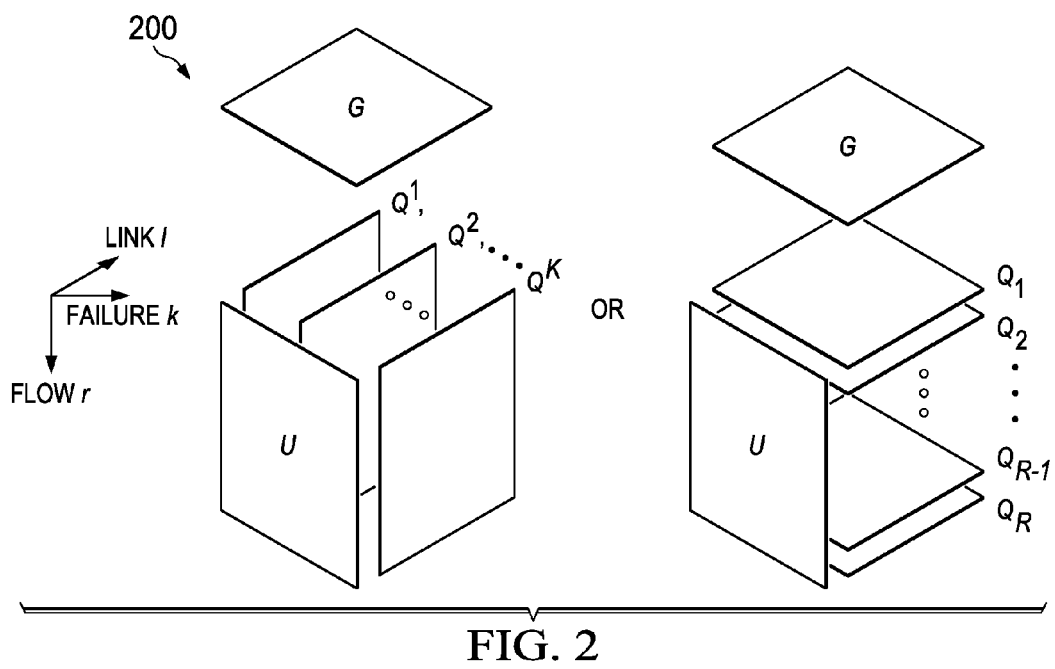
FIG. 2 illustrates a model for computing a spare provision matrix (SPM) according to a failure dependent (FD) path protection based spare capacity allocation (SCA) model.

FIG. 2 shows a model 200 for computing a SPM according to the FD path protection based SCA model. In the SCA model 200, multiple backup paths $q_r^k$ for flow r protect different failure scenarios k represented in the flow failure matrix U. These multiple backup paths $q_r^k$ can be represented in two ways: either for each failure scenario k in $Q^k$, or for each flow r in $Q_r$. The model 200 includes 3-dimensional matrices which are used to compute the SPM. The model 200 includes the equation:

$$G_k = Q^{k^T} M U_k, \quad 1 \leq k \leq K, \tag{1}$$

where the k-th column vector $G_k = \{g_{lk}\}_{L \times 1}$ in matrix G is determined by U's k-th column vector $U_k = \{u_{rk}\}_{R \times 1}$, M, and $Q_k$. A capital variable $U_k$ is used for a column vector to distinguish the column vector from the row vector $u_r$. Capital variables are similarly used for $G_k$.

In an embodiment, a scheme based on the FD path protection SCA model above can be used for SCA with PDP for dual failure protection in bi-connected network topology. The embodiment scheme extends the model above by arranging all secondary backup paths to align with their protected dual fiber cuts, and then computing the SPM accordingly. After computing the SPM, the SPM can be used for spare capacity sharing based on a scheme for failure independent path protection described by Y. Liu, et al. in "Approximating optimal spare capacity allocation by successive survivable routing," in Proceeding of IEEE INFOCOM, 2001, and "Approximating optimal spare capacity allocation by successive survivable routing," IEEE/ACM Transactions on Networking, 2005, both of which are incorporated herein by reference.

Figure 3:
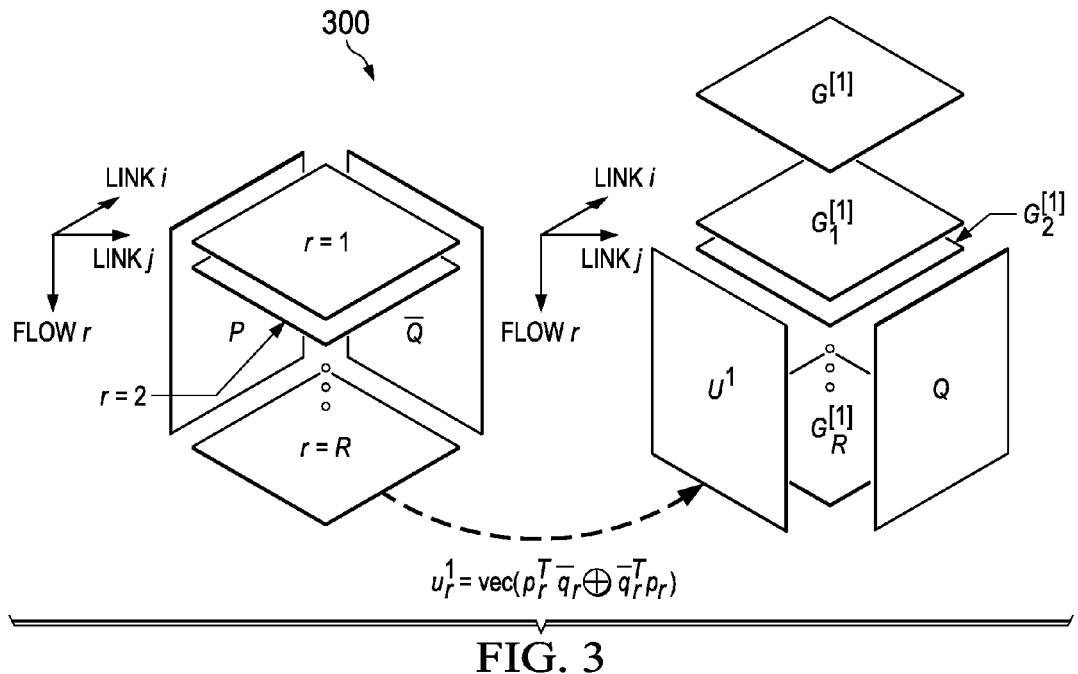
FIG. 3 illustrates a model for computing a SPM for primary backup paths.

The embodiment scheme is also based on the SCA model for dual link failures in tri-connected networks by V. Y. Liu, et al., in "Spare Capacity Allocation Using Shared Backup Path Protection for Dual Link Failures," IEEE 8th International Workshop on the Design of Reliable Communication Networks (DRCN), 2011, which is incorporated herein by reference. FIG. 3 shows a model 300 for computing a SPM for primary backup paths according to this SCA model. The model 300 examines failure scenarios for a single flow r. The contribution of flow r to the spare provision matrix $G_r$ is used as the building block for spare capacity sharing. Element $g_{lk}^r$ indicates the spare capacity required for flow r on link l when a dual fiber failure case k happens. The total number of dual fiber failure is $$K = \binom{L}{2}.$$

Each failure k∈1 . . . K stands for a pair of failed fibers i, j and the index k is determined by k=(i−1)×L+(j−i) where 1≤i<j≤L. The model 300 assumes that the failures of two fibers happen at the same time or shortly close to each other so that the traffic rerouting happens only once. In dual fiber failure scenario k, the working and backup paths of flow r may be impacted and the spare capacity on their backup paths needs bandwidth reservation as discussed in the following two cases.

In a first case, when a dual fiber failure k breaks the working path, but not the primary backup path, traffic may be protected by the primary backup path. The links on the primary backup path requires a bandwidth demand $m_r$. In the model 300 formulation, $p_{ri}=1$ if and only if (iff) fiber i is on the working path $p_r$, and $q_{rj}=1$ iff a fiber j is on the primary backup path $q_r$. Thus, $p_{ri}(1-q_{rj})=1$ indicates that fiber i is on the working path while fiber j is not on the primary backup path. If $u_{rk}^{[1]} = p_{ri}(1-q_{rj}) \oplus (1-q_{ri})p_{rj}$, where $\oplus$ is the logical OR operation which gives 1⊕1=1, then $u_{rk}^{[1]}=1$ indicates that failure k contains one fiber on the working path $p_r$ but does not contain any link on the primary backup path $q_r$. For this failure case k, the spare capacity on another link l on the primary backup path can reserve bandwidth $m_r$. This is formulated in $g_{lk}^{r[1]}=m_r q_{rl} u_{rk}$. These relations can also be rewritten in a vector or matrix format in equations (2) and (3) as follows:

$$G_r^{[1]}=\{g_{lk}^{r[1]}\}=m_r q_r^T u_r^{[1]}, \quad (2)$$

$$u_r^{[1]}=\text{vec}(p_r^T \bar{q}_r \oplus \bar{q}_r^T p_r). \quad (3)$$

In the above equations, vec(•) converts a matrix with index (i, j) into a row vector with index k and $\bar{q}_r = e - q_r$, where e is a unit row vector with size L.

The length of the row vector $u_r^{[1]}$ is $L^2$ instead of number of failures $$\binom{L}{2}.$$

This helps to maintain easier matrix formulation and conversion between k and i, j. The actual failure size can be controlled by removing duplicated cases during the implementation. For this reason, k=(i−1)L+j and K=$L^2$ are used in the following context.

Figure 4:
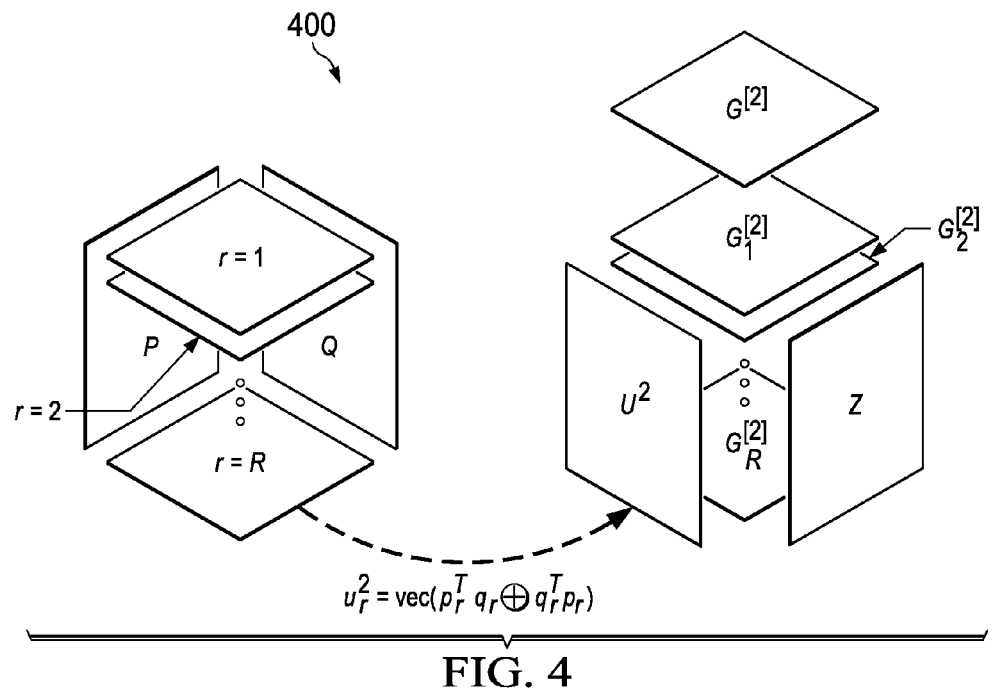
FIG. 4 illustrates a model for computing a SPM for secondary backup paths.

In a second case, when the failure case k contains one fiber on the working path $p_r$ and another fiber on the primary backup path $q_r$, traffic is rerouted to the secondary backup path $z_r$. Thus, the links on the secondary backup path need spare capacity to meet bandwidth demand $m_r$ for failure case k. FIG. 4 shows a model 400 for computing a SPM for secondary backup paths according to the same SCA model. In this case, $u_{rk}^{[2]}=p_{ri}q_{rj} \oplus q_{ri}p_{rj}$, and $u_{rk}^{[2]}=1$ indicates failure case k breaks the working path $p_r$ and the primary backup path $q_r$ at the same time. Hence, the spare capacity on link l on the secondary backup path is $m_r$. This gives $g_{lk}^{r[2]}=m_r z_{rl} u_{rk}^{[2]}$. These equations can be rewritten in matrix format in equations (4) and (5) as follows:

$$G_r^{[2]}=\{g_{lk}^{r[2]}\}=m_r z_r^T u_r^{[2]}, \quad (4)$$

$$u_r^{[2]}=\text{vec}(p_r^T q_r \oplus q_r^T p_r). \quad (5)$$

The resulting SPM for primary and secondary backup paths is:

$$G_r=G_r^{[1]}+G_r^{[2]}, \quad (6)$$

$$G=\Sigma_{r=1}^R G_r. \quad (7)$$

Using the formulations above, the overall SCA model for dual link failures in tri-connected networks is formulated in equations (8) to (15) as follows:

$$\min_{Q,Z,G,s} S=e^T s \quad (8)$$

$$\text{subject to: } s=\max G \quad (9)$$

$$G=Q^T M U^{[1]}+Z^T M U^{[2]} \quad (10)$$

$$P+Q \leq 1 \quad (11)$$

$$P+Q+Z \leq 1 \quad (12)$$

$$QB^T=D \quad (13)$$

$$ZB^T=D \quad (14)$$

$$Q,Z: \text{binary} \quad (15)$$

The objective function (8) is used to minimize the total spare capacity reserved on the network. Its decision variables include the spare capacity s; the spare provisioning matrix G; the primary backup path matrix Q; and the secondary backup path matrix Z. In constraint (9), the spare capacity column vector s is derived from the maximum values of elements in rows, across all failures, in the spare provision matrix G. It indicates that the required spare capacity on a link is equivalent to the highest "watermark" from all possible dual fiber failures. In constraint (10), the spare provision matrix is derived from backup paths. It is a matrix format, equivalent to the aggregation of per-flow based information from equations (7), (6), (2), and (4). Constraints (11) and (12) require the working and two backup paths to be mutually disjoint, where these paths use the same link at most once. Constraints (13) and (14) are the flow balance requirements, to guarantee that these paths in Q and Z to be valid routes between the source and destination nodes. Constraint (15) requires backup path decision variables to be binary ensuring each backup path is not bifurcated. Row vectors $u^{[y]}$ in $U^{[y]}$, y=1, 2 are derived in equations (3) and (5) to indicate which failure case k could cause traffic detour to its primary or secondary backup path.

Table 1 shows the notations used in the models 300 and 400 for dual link failures in tri-connected network topology. The same notations are used for the embodiments herein.

TABLE 1

| | |
|---|---|
| N, L, R, K | Numbers of nodes, links, flows, and failures |
| n, l, r, k | Indices of nodes, links, flows, and failures |
| i, j | Indices of fibers in a dual failure k, $1 \leq i, j \leq L$ |
| $B = \{b_{nl}\}_{N \times L}$ | Node link incidence matrix |
| $D = \{d_{rn}\}_{R \times N}$ | Flow node incidence matrix |
| $P = \{p_r\} = \{p_{rl}\}$ | Working path link incidence matrix |
| $Q = \{q_r\} = \{q_{rl}\}$ | Primary backup path link incidence matrix |
| $Z = \{z_r\} = \{z_{rl}\}$ | Secondary backup path link incidence matrix, for failure independent case |
| $Z^k = \{z_r^k\}_{R \times 1} = \{z_{rl}^k\}_{R \times L}$ | Secondary backup path link incidence matrix to protect failure k, for failure independent case |
| $Z_r = \{z_r^k\}_{K \times 1} = \{z_{rl}^k\}_{K \times L}$ | Secondary backup path link incidence matrix for flow r, for failure independent case |
| $M = \text{Diag}(\{m_r\})$ | Diagonal matrix of bandwidth $m_r$ of flow r |
| $G_r^{[y]} = \{g_{lk}^{r[y]}\}_{L \times K}$ | Contribution of flow r's y-th backup path to G, y = 1 or 2 for primary or secondary |
| $G = \{g_{lk}\}_{L \times K}$ | Spare provision matrix, $g_{lk}$ is spare capacity on link l for failure k |
| $U^{[y]} = \{u_{rk}^{[y]}\}_{R \times K}$ | The incidence matrix for flow r's y-th backup path and failures, $u_{rk}^y = 1$ iff failure scenario k causes flow r's traffic to use its y-th backup path, y = 1 or 2 |
| $T^{[y]} = \{t_{rl}^{[y]}\}_{R \times L}$ | Flow's tabu-link matrix for its y-th backup path, $t_{rl}^{[y]} = 1$ if link l should not be used on flow r's y-th backup path, y = 1 or 2 |
| $S_1, S_2$ | Total spare capacity reserved for the primary or secondary backup paths |
| $Y_r$ | Number of cut-groups for flow r |

TABLE 1-continued

| | |
|---|---|
| $(\phi_{ry}, \psi_{ry})$ | Represent cut groups of flow r, $1 \leq y \leq Y_r$, where $\phi_{ry}$ and $\psi_{ry}$ are binary vectors whose element i is 1 iff the i-th link belongs to the first ($\phi$) or second ($\psi$) half of the cut-group, and $1 \leq i \leq L$ |
| $\tau_{ry}$ | Binary vector whose k-th element indicates dual link failure k may be protected by the y-th secondary backup path of flow r, $0 \leq y \leq Y_r$. |
| $\chi_{ry}$ | Binary vector whose k-th element indicates dual link failure k may not be protected due to either limitation of bi-connectivity or constraints on maximum number of paths for flow r, $1 \leq y \leq Y_r$. |
| $\omega_r^y$ | The y-th secondary backup path corresponding to the y-th cut-group for flow r, which is passing the first half of the y-th cut-group while the second halves of the other cut-groups. |

To formulate the SCA model using PDP to protect against dual link failures in bi-connected networks, a partial disjoint routing algorithm based on the formulation of the max flow algorithm (used in FIG. 1) is used to identify the dual failure scenarios that a set of secondary backup paths could protect. Next, a formulation based on the FD path protection SCA model (the model 200) is used to align these secondary backup paths to their corresponding dual link failure scenarios. The SPM is then computed to be used for spare capacity sharing for dual link failures based on the SCA model (models 300 and 400) for dual link failures in tri-connected networks.

Figure 5:
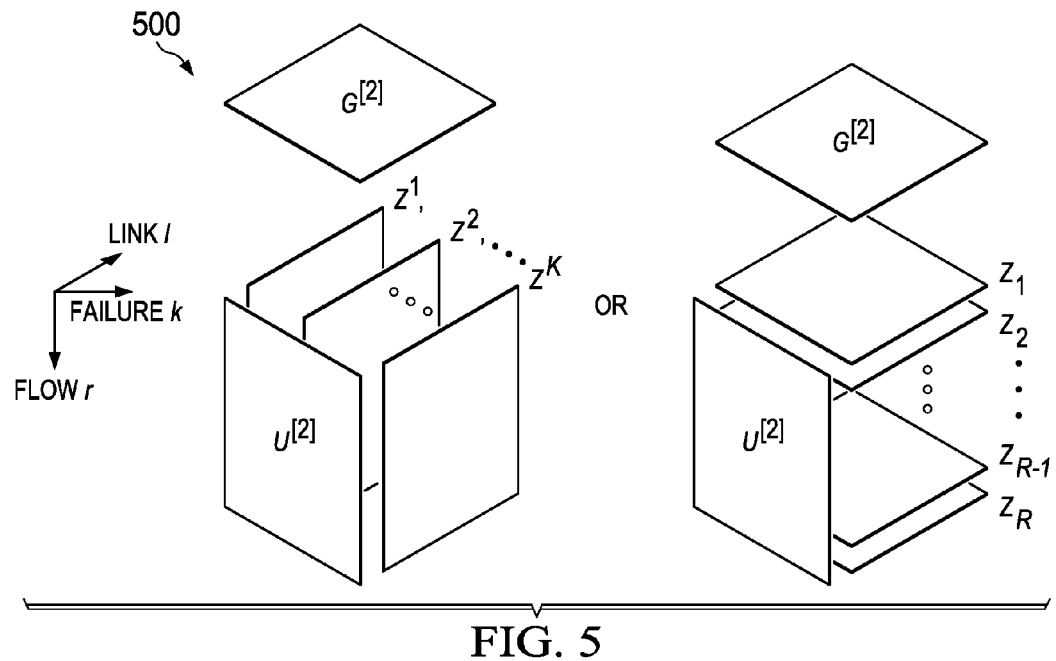
FIG. 5 is an embodiment of a model for computing a spare provision matrix (SPM) for partial disjoint paths (PDP).

FIG. 5 shows an embodiment of a model 500 for computing SPM for partial disjoint paths (PDP). The model 500 is used to compute the SPM for multiple secondary backup paths to protect different failures while sharing their spare capacity. These secondary backup paths can be represented according to the specific flow r as $Z_r$, or alternatively for specific failure k as $Z_r^k$. Both of these matrices contain the same path link incidence vector $z_r^k$ for the secondary path that protects failure k for flow r as defined in Table 1.

To formulate the content in vector $z_r^k$ and their corresponding failures protected by these partial disjoint paths, a partial disjoint routing algorithm based on the formulation of the max flow algorithm is used. Using the partial disjoint routing algorithm, a flow on a bi-connected network could encounter a set of cut-groups whose enclosed cut-pairs can partition the source and destination nodes. The number of cut-groups is identical to the minimum number of secondary backup paths to cover all possible dual fiber cuts. The number of cut-groups is denoted as $Y_r$. The cut-groups are in $(\phi_{ry}, \psi_{ry})$, $1 \leq y \leq Y_r$, where $\phi_{ry}$ and $\psi_{ry}$ are binary vectors whose element i is 1 iff the i-th link belongs to the first ($\phi$) or second ($\psi$) half of the cut-group, and $1 \leq i \leq L$.

For example, the binary vectors are considered in the equations below for two cut-groups (1, [2, 3]) and (4, 5) in FIG. 1, where r=(st), y=1, or 2, and a comma is added between (st) and r for clarity:

$$\phi_{(st),1} = (10000\ldots),$$

$$\psi_{(st),1} = (01100\ldots),$$

$$\phi_{(st),2} = (00010\ldots),$$

$$\psi_{(st),2} = (00001\ldots). \quad (16)$$

The corresponding two secondary backup paths for flow r=(st) are represented in the equations below as $\omega_{(st)}^y$, where the index y represents the cut-group whose first half links are used by this path, while its second half links are protected by this path:

$$p_{(st)} = (10010\ldots),$$

$$q_{(st)} = (01101\ldots),$$

$$\omega_{(st)}^1 = (10001\ldots),$$

$$\omega_{(st)}^2 = (01110\ldots). \quad (17)$$

The original failure vector for secondary paths $u_r^{[2]}$ in equation (5) above takes all dual links on the first two paths. Due to the existence of the cut-pairs in these $Y_r$ cut-groups, multiple secondary backup paths are protecting different subsets of these dual link failures.

Figure 6:
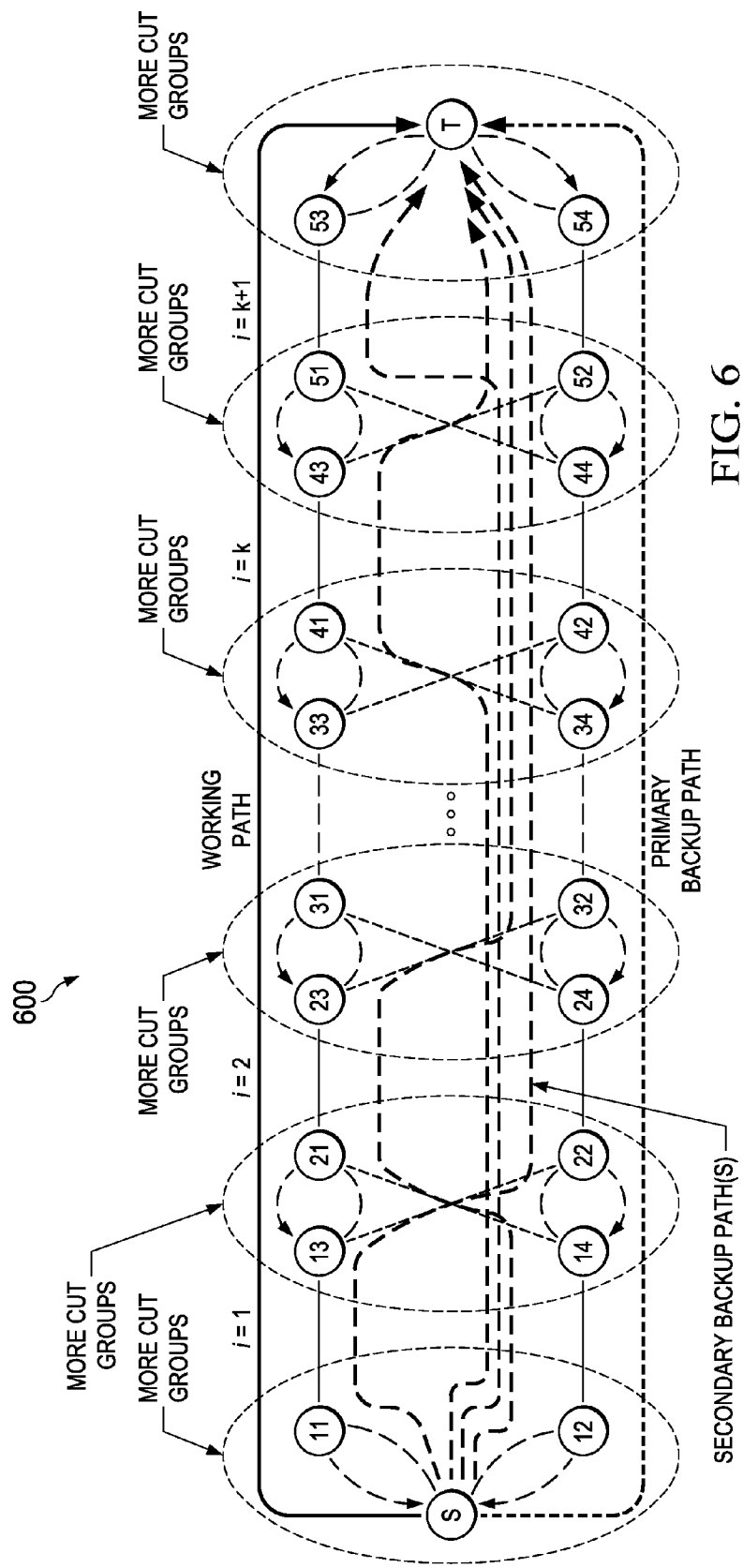
FIG. 6 illustrates an embodiment scheme to construct partially disjoint paths for a flow from a set of fiber cut-groups.

More notations are further introduced below to model the various dual link failures surrounding the cut-groups. FIG. 6 shows an embodiment scheme 600 to construct PDP for a flow from a set of fiber cut-groups. Using the partial disjoint path routing algorithm, multiple secondary paths are constructed to protect corresponding cut-groups so that the y-th secondary backup path may always protect the dual failures, which include the second half of the y-th cut-groups and the first halves of other cut-groups. This is accomplished by forcing this backup path to pass the first half of the y-th cut-group and the second halves of any other cut-groups, as shown in FIG. 6.

In the scheme 600, the dual link failures protected by the y-th secondary backup paths can be represented in $\tau_{ry}$ as follows:

$$\tau_{ry} = vec(\hat{\phi}_{ry}^T \psi_{ry} \oplus \psi_{ry}^T \hat{\phi}_{ry}), \; 1 \leq y \leq Y_r, \quad (18)$$

where $\hat{\phi}_{ry} = \Phi_r - \phi_{ry}$, $\hat{\psi}_{ry} = \Psi_r - \psi_{ry}$, and $\Phi_r = \sum_{y=1}^{Y_r} \phi_{ry}$, $\Psi_r = \sum_{y=1}^{Y_r} \psi_{ry}$. The first two secondary backup paths can also protect other dual link failures that straddle on the first two paths which do not belong to the cut-pairs defined above. This is represented using $\tau_{r0}$, plus its components $\tau_{r0}^1$ and $\tau_{r0}^2$ (for failures protected by the first two secondary backup paths) as:

$$\begin{aligned}\tau_{r0} &= \tau_{r0}^1 + \tau_{r0}^2 \\ &= vec(p_r^T q_r \oplus q_r^T p_r) - vec(\Phi_r^T \Psi_r \oplus \Psi_r^T \Phi_r) \\ &= u_r^{[2]} - vec(\Phi_r^T \Psi_r \oplus \Psi_r^T \Phi_r).\end{aligned} \quad (19)$$

The dual link failures that cannot be protected by these secondary backup paths are those failures whose links belong to the first and second halves of the same cut-groups, modeled as $\chi_{ry}$ in:

$$\chi_{ry} = vec(\phi_{ry}^T \psi_{ry} \oplus \psi_{ry}^T \phi_{ry}), \; 1 \leq y \leq Y_r. \quad (20)$$

The unprotected dual link failures in $\chi_{ry}$, $1 \leq y \leq Y_r$, and the dual link failures protected by all secondary backup paths $\tau_{ry}$, $0 \leq y \leq Y_r$ are identical to all dual link failures that could disconnect the first two paths $u_r^{[2]}$. This can be shown as follows:

$$\sum_{y=1}^{Y_r} \chi_{ry} + \sum_{y=0}^{Y_r} \tau_{ry} = \sum_{y=1}^{Y_r} (\chi_{ry} + \tau_{ry}) + \tau_{r0}, \quad (21)$$

$$= \sum_{y=1}^{Y_r} \begin{bmatrix} vec(\phi_{ry}^T \psi_{ry} \oplus \psi_{ry}^T \phi_{ry}) + \\ vec(\phi_{ry}^T \hat{\psi}_{ry} \oplus \psi_{ry}^T \hat{\phi}_{ry}) \end{bmatrix} + \tau_{r0},$$

$$= \sum_{y=1}^{Y_r} [vec(\phi_{ry}^T \Psi_r \oplus \Psi_r^T \Phi_r)] + \tau_{r0},$$

$$vec(\Phi_r^T \Psi_r \oplus \Psi_r^T \Phi_r) + \tau_{r0},$$

$$= u_r^{[2]}.$$

According to the model 500 above, the secondary backup paths for flow r and failure k are denoted as a binary vector $\omega_r^k$. The paths can be aggregated based on each failure k as $Z^k$, $1 \leq k \leq K$; or based on each flow r as $Z_r$, $1 \leq r \leq R$. The representation of $Z_r$ is used below to contain all these paths in $\omega_r^y$ for different dual link failures. Similarly, these partially disjoint secondary backup paths in $\omega_r^y$ may be aggregated using the other approach with $Z^k$ based on each dual link failure k.

In the model 500, the number of cut-groups of a flow r is $Y_r$. Using the partially disjoint path routing algorithm formulation, the number of partially disjoint backup paths is also $Y_r$. These paths are denoted above as $z_r^y$. These backup paths and their protected dual link failures indicated in $\tau_{ry}$, $0 \leq y \leq Y_r$ are considered in the subsequent formulations below, ignoring the dual link failures in $\chi_{ry}$ that cannot be protected. In equation (21), all dual link failures that disrupt the flow r are shown in $u_r^{[2]}$ and include the above two types of failures: protectable failures indicated in $\tau_{ry}$ and unprotected failures $\chi_{ry}$. The unprotected failures are due to the limitation of bi-connectivity and the constraint enforced while performing the partially disjoint path routing procedure, which limits the maximum number of backup paths to a smaller number than the number of cut-groups.

The partially disjointed paths in $\omega_r^y$ can be organized into the per-flow based secondary backup path matrix $Z_r$ as follows:

$$Z_r = \tau_{r0}^1 \omega_r^1 + \tau_{r0}^2 \omega_r^2 + \sum_{y=1}^{Y_r} \tau_{ry} \omega_r^y, \quad 1 \leq r \leq R. \quad (22)$$

For the y-th secondary backup path, its contribution to the spare provisioning matrix $G_{ry}^{[2]}$ can be obtained by equations (23) and (24) as follows:

$$G_{ry}^{[2]} = m_r \omega_r^{yT} \tau_{ry}, \quad 3 \leq y \leq Y_r, \quad (23)$$

$$G_{r1}^{[2]} = m_r \omega_r^{1T} (\tau_{r1} + \tau_{r0}^1),$$

$$G_{r2}^{[2]} = m_r \omega_r^{2T} (\tau_{r2} + \tau_{r0}^2). \quad (24)$$

The SPM for the secondary backup paths is given in equations (25) and (26) as follows:

$$G_r^{[2]} = \sum_{y=1}^{Y_r} G_{ry}^{[2]}, \quad (25)$$

$$G^{[2]} = \sum_{r=0}^{R} G_r^{[2]}, \quad (26)$$

In an embodiment, an ILP formulation of the SCA problem for dual link failures using PDP in bi-connected networks includes equations (8), (9), (11), (13), (18), (19) and (23) to (30) as follows:

$$\min_{Q, \omega_r^y, G, s} S = e^T s, \quad (8')$$

$$s.t.: s = \max G, \quad (9')$$

$$P + Q \leq 1, \quad (11')$$

$$QB^T = D, \quad (13')$$

$$\tau_{ry} = vec(\phi_{ry}^T \hat{\psi}_{ry} \oplus \psi_{ry}^T \hat{\phi}_{ry}), \quad 1 \leq y \leq Y_r, \quad (18')$$

$$\tau_{r0} = vec(p_r^T q_r \oplus q_r^T p_r) - vec(\Phi_r^T \Psi_r \oplus \Psi_r^T \Phi_r), \quad (19')$$

$$G_{ry}^{[2]} = m_r \omega_r^{yT} \tau_{ry}, \quad 3 \leq y \leq Y_r, \quad (23')$$

$$G_{r1}^{[2]} = m_r \omega_r^{1T} (\tau_{r1} + \tau_{r0}^1),$$

$$G_{r2}^{[2]} = m_r \omega_r^{2T} (\tau_{r2} + \tau_{r0}^2), \quad (24')$$

$$G_r^{[2]} = \sum_{y=1}^{Y_r} G_{ry}^{[2]}, \quad (25')$$

$$G^{[2]} = \sum_{r=0}^{R} G_r^{[2]}, \quad (26')$$

$$G = Q^T M U^{[1]} + G^{[2]}, \quad (27)$$

$$p_r + q_r + \omega_r^y - \phi_{ry} - \sum_{j=1; j \neq y}^{Y_r} \psi_{rj} \leq 1, \quad 1 \leq y \leq Y_r, \quad 1 \leq r \leq R, \quad (28)$$

$$\omega_r^y B^T = D, \quad 1 \leq y \leq Y_r, \quad 1 \leq r \leq R, \quad (29)$$

$$Q, \omega_r^y: \text{binary}, \quad 1 \leq y \leq Y_r, \quad 1 \leq r \leq R. \quad (30)$$

Equations (8'), (9'), (11'), (13'), (18'), (19'), and (23') to (26') above are similar to the previously introduced equations with the same numbers. The cut-groups related information in ($\phi_{ry}$, $\psi_{ry}$) is pre-computed for each flow r according to the max flow based algorithm.

In another embodiment, the ILP formulation establishes the matrix $G_r^{[2]}$ using the construction of $u_r^{[2]}$ in equation (21) and $Z_r$ in equation (2), as follows:

$$G_r^{[2]} = m_r z_r^k u_k^{[2]}, \quad 1 \leq k \leq K, \quad 1 \leq r \leq R. \quad (31)$$

This approach has the same effect as using equations in (23) to (25) above but it keeps the matrix diagram as shown in FIG. 5. The two ILP formulations above can be solved using commercial software such as AMPL/CPLEX that enumerates all possible solutions for relatively small matrix cases, e.g., for smaller networks with fewer flows/links. For relatively large network or matrix cases, a heuristic approach may be more suitable.

Figure 7:
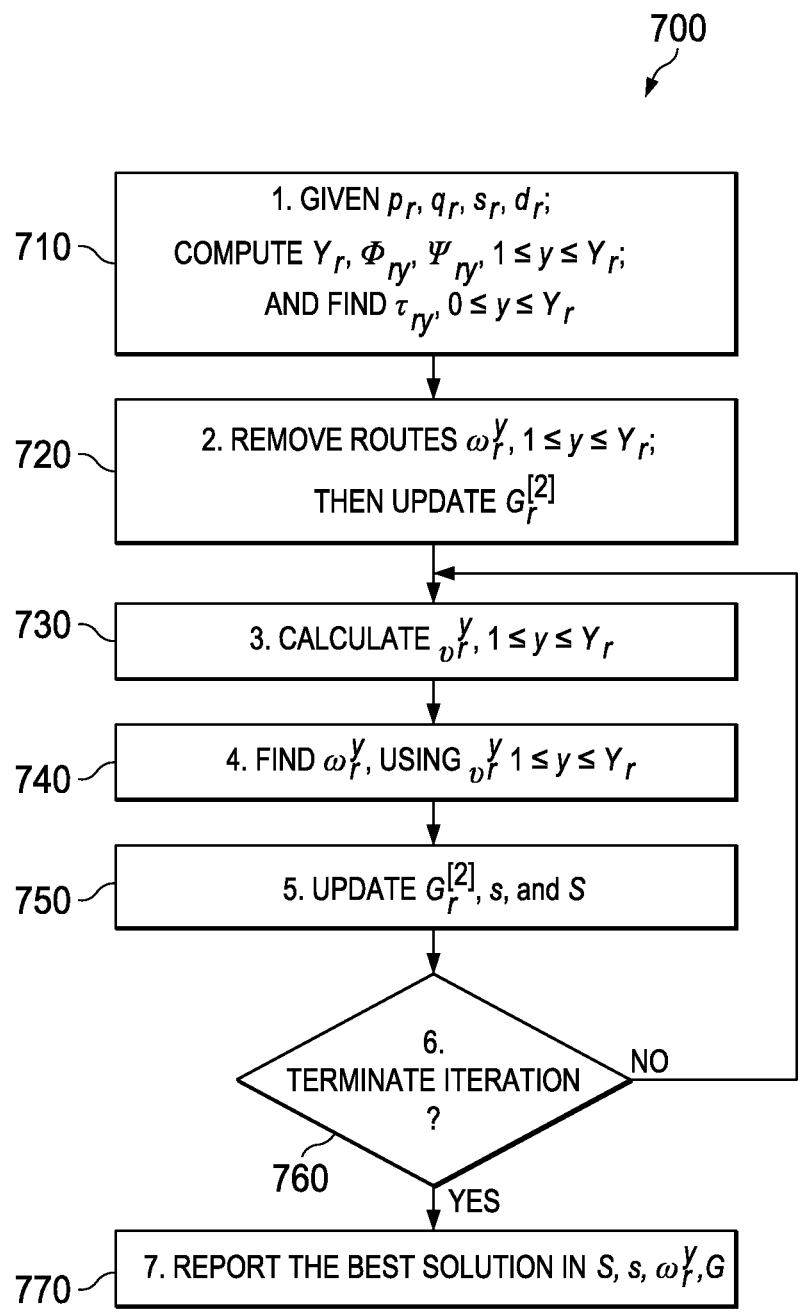
FIG. 7 illustrates an embodiment of a successive survivable routing (SSR) method for computing partially disjoint secondary backup paths.

The Successive Survivable Routing (SSR) algorithm is used to find near optimal solution in shorter time (than the commercial software solution for the ILP formulation) for relatively large scale SCA problems. The SSR algorithm was developed for the single failure problem, and subsequently extended to the FD dependent path restoration SCA problem, the two layer single failure SCA case, and to dual link failures. FIG. 7 shows an embodiment of a SSR method 700 for computing partially disjoint secondary backup paths, which can be used for the SCA problem for dual link failures using PDP in bi-connected networks. The method 700 finds the SCA solutions by routing the partially disjoint secondary backup paths iteratively. The working paths and primary backup paths can be handled using as the SCA model for dual link failures in tri-connected networks.

In the method 700, each backup path computation uses a shortest path algorithm. The link routing metric is the incremental spare capacity $v_r^y = \{v_{rl}^y\}$ for flow r's y-th secondary backup path. It is computed from the most recent spare provision matrix $G^{[2]}$ that is further based on previously routed backup paths. After all flows find their $Y_r$ partially disjoint secondary backup paths, the SSR algorithm continues to update existing backup paths whenever a new one could use less spare capacity. This process keeps reducing total spare capacity until it converges, (e.g., there are no more backup path updates). Different random ordering of the flows for routing backup paths are used to provide diversity and avoid local minima. The best solution is used as the final one.

The SSR method 700 includes several steps for a given flow r and its y-th secondary backup path as shown in FIG. 7. Block 710 includes a first step, where the protectable failures in vector $\tau_{ry}$ for flow r's y-th cut-group are calculated based on the cut-group information stored in $\phi_{ry}$ and $\psi_{ry}$ found using the max flow based algorithm, the working path in $p_r$, the primary backup path in $q_r$, and the source and destination nodes s(r), d(r). The protectable failures in $\tau_{ry}$ are then computed using equations (18) and (19). Block 720 includes a second step, where the current y-th secondary backup path of flow r is first removed, if there is one, and then the spare provision matrix $G^{[2]}$ is updated using equations (23) to (26).

Block 730 includes a third step, where the link metric $v_r^y$ is calculated from $G^{[2]}$ and flow r's y-th secondary backup path contribution $G_{ry}^{[2]}$ using equations (23) to (24). Specifically, given G, $\omega_r^y$, and $G_{ry}^{[2]}$ for current flow r, $G^{-ry}$ (the spare provision matrix) and $s^{-ry}$ (the link spare capacity vector after current secondary backup path $\omega_r^y$ is removed) are obtained using $G^{-ry}=G-G_{ry}^{[2]}$ and $s^{-ry}=\max G^{-ry}$. Further, $\omega_r^{y*}$ is used to denote an alternative backup path for flow r's y-th secondary backup path, and a function $G_{ry}^{[2]*}(\omega_r^{y*})=m_r\omega_r^{y*T}[\tau_{ry}+\tau_{r0}^1\ \delta(y=1)+\tau_{r0}^2\ \delta(y=2)]$ is defined, where $\delta(x)=1$ if x is true or 0 otherwise. This new path $\omega_r^{y*}$ produces a new spare capacity reservation vector in a function format of $$s^*(\omega_{ry}^*)=\max[G^{-ry}+G_{ry}^{[2]*}(\omega_r^{y*})]. \quad (32)$$

The constraint $\omega_{ry}^{y*}=e-p_r-q_r+\phi_{ry}+\Sigma_{j=1;\ j\neq y}^{Y_r}\psi_{rj}$ is also used, which assumes that the partially disjoint secondary backup path uses all other links not used by the first two paths, excluding those specified in the cut-groups as indicated in $\phi_{ry}$ and $\psi_{rj}$. As such, the following vector can be found:

$$v_r^y=\{v_{rl}^y\}_{L\times 1}=s^*(\omega_r^{y*})-s^{-ry}, \quad (33)$$

where the element $v_{rl}^y$ is the cost of the incremental spare capacity on link l if this link is used on the backup path.

Block 740 includes a fourth step, where the shortest path algorithm is used with the link metric $v_r^y$ to find a new or updated backup path $\omega_r^{y*}$. This path may be partially disjoint according to the constraint enforced in block 730. The total incremental spare capacity along the path is also minimized due to the link costs used in block 730 (equation (33)). Block 750 includes a fifth step, where the original backup path $\omega_r^y$ is replaced with the new backup path $\omega_r^{y*}$ if the new path has the lower cost based on the link metrics in $v_r^y$, e.g., the new path is updated only when $v_r^{yT}\omega_r^y<v_r^{yT}\omega_r^{y*}$.

Condition block 760 includes a sixth step, where if a termination condition is not met then the method 700 returns to block 720 for the next backup paths, for all $Y_r$ secondary backup paths corresponding to their cut-groups of flow r and then for all flows $1\leq r\leq R$. After the end of each iteration for all flows, the algorithm can stop and go to block 770 if the termination condition is met. For instance, the termination condition may be met when there is no backup update for all flows in the recent iteration, or when the maximum (predetermined) number of updates is reached. Block 770 includes a seventh step, where the best results are reported after terminating the iterations of the SSR algorithm.

Figure 8:
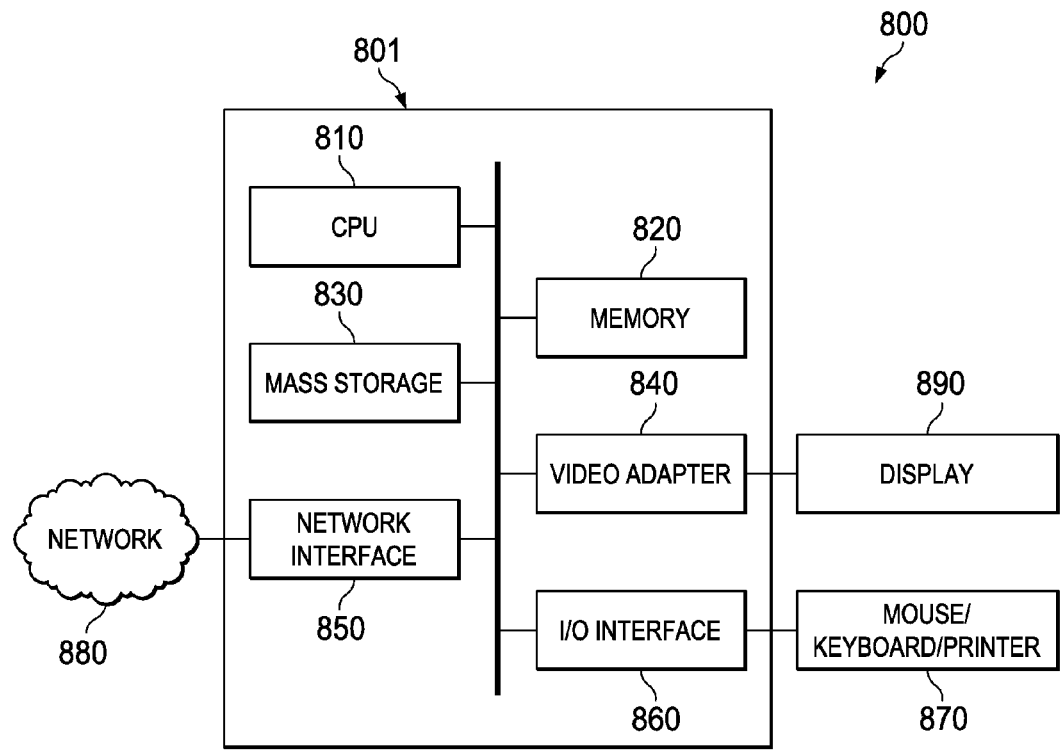
FIG. 8 is a block diagram of a processing system that can be used to implement various embodiments.

FIG. 8 is a block diagram of a processing system 800 that can be used to implement various embodiments. For example, the processing system 800 may be part of or coupled to a network component, such as a router, a server, or any other suitable network component or apparatus. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 800 may comprise a processing unit 801 equipped with one or more input/output devices, such as a speaker, microphone, mouse, touchscreen, keypad, keyboard, printer, display, and the like. The processing unit 801 may include a central processing unit (CPU) 810, a memory 820, a mass storage device 830, a video adapter 840, and an I/O interface 860 connected to a bus. The bus may be one or more of any type of several bus architectures including a memory bus or memory controller, a peripheral bus, a video bus, or the like.

The CPU 810 may comprise any type of electronic data processor. The memory 820 may comprise any type of system memory such as static random access memory (SRAM), dynamic random access memory (DRAM), synchronous DRAM (SDRAM), read-only memory (ROM), a combination thereof, or the like. In an embodiment, the memory 820 may include ROM for use at boot-up, and DRAM for program and data storage for use while executing programs. In embodiments, the memory 820 is non-transitory. The mass storage device 830 may comprise any type of storage device configured to store data, programs, and other information and to make the data, programs, and other information accessible via the bus. The mass storage device 830 may comprise, for example, one or more of a solid state drive, hard disk drive, a magnetic disk drive, an optical disk drive, or the like.

The video adapter 840 and the I/O interface 860 provide interfaces to couple external input and output devices to the processing unit. As illustrated, examples of input and output devices include a display 890 coupled to the video adapter 840 and any combination of mouse/keyboard/printer 870 coupled to the I/O interface 860. Other devices may be coupled to the processing unit 801, and additional or fewer interface cards may be utilized. For example, a serial interface card (not shown) may be used to provide a serial interface for a printer.

The processing unit 801 also includes one or more network interfaces 850, which may comprise wired links, such as an Ethernet cable or the like, and/or wireless links to access nodes or one or more networks 880. The network interface 850 allows the processing unit 801 to communicate with remote units via the networks 880. For example, the network interface 850 may provide wireless communication via one or more transmitters/transmit antennas and one or more receivers/receive antennas. In an embodiment, the processing unit 801 is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method implemented by an apparatus for allocating shared spare resource capacity for a plurality of flows on partial disjoint paths (PDP), the method comprising:
   for each of the flows, finding a working path and a primary backup path that are mutually disjoint between a source node and a terminal node of the flow that are connected via two disjoint routes, the disjoint routes including a plurality of nodes, links, and fiber cuts; and
   finding a plurality of secondary backup paths that are partially disjoint and protect each fiber cut group along the two disjoint routes, wherein each of the fiber cut groups includes all fiber cut pairs on both disjoint routes that have the same effect of interrupting the flow on both disjoint routes; and aggregating the shared spare resource capacity for the working path, the primary backup path, and the partially disjoint secondary backup paths for all the flows.

2. The method of claim 1 further comprising:

for each of the flows, identifying dual link failures on the two disjoint routes to be protected by the secondary backup paths;

aligning the secondary backup paths to their corresponding dual link failures; and for all the flows, computing a spare provision matrix (SPM) for spare capacity allocation (SCA) for the dual link failures.

3. The method of claim 2, wherein computing the SPM includes:

for each of the flows, grouping all dual link failures protected by each secondary backup path of the secondary backup paths;

grouping all other dual link failures that straddle on the two disjoint routes and are protected by first two secondary backup paths;

computing a first contribution matrix to the SPM using bandwidth information and the grouping of all dual link failures protected by each of the secondary backup paths;

computing a second contribution matrix to the SPM using bandwidth information and the grouping of all other dual link failures that straddle on the two disjoint routes and are protected by first two secondary backup paths;

computing a total contribution matrix for all secondary backup paths; and aggregating for all the flows the total contribution matrix for all secondary backup paths.

4. The method of claim 3, wherein computing the SPM includes:

for all the flows, computing a third contribution matrix to the SPM for the primary backup path using a primary backup path incidence matrix, a diagonal matrix for bandwidth of the primary backup path, and a tabu link matrix; and computing the SPM as a sum of the aggregated total contribution matrix for all secondary backup paths and the contribution matrix for the primary backup path.

5. The method of claim 4, further comprising computing a SCA vector by selecting a maximum value element from each row of the SPM.

6. The method of claim 2 further comprising solving the SPM for SCA using a mathematical programming language (AMPL) software with integer linear programming (ILP) solver.

7. A method implemented by an apparatus for allocating shared spare resource capacity for a flow, the method comprising:

assigning a working path and a primary backup path on two disjoint routes between two end nodes; and assigning a plurality of secondary backup paths that are partially disjoint and that each pass through one fiber cut group on one of the two disjoint routes and all remaining fiber cut groups on the other one of the two disjoint routes, wherein each of the fiber cut groups includes all fiber cut pairs on both disjoint routes that have the same effect of interrupting a flow on both disjoint routes.

8. The method of claim 7 further comprising:

identifying dual link failures on the two disjoint routes to be protected by the secondary backup paths;

aligning the secondary backup paths to their corresponding dual link failures; and computing a spare provision matrix (SPM) for spare capacity allocation (SCA) for the dual link failures.

9. The method of claim 8 further comprising solving the SPM for SCA using a Successive Survivable Routing (SSR) algorithm to find near optimal solution in shorter time than using a mathematical programming language (AMPL) software with integer linear programming (ILP) solver.

10. The method of claim 9, wherein the SSR algorithm includes:

for each secondary backup path of the secondary backup paths, establish a vector of fiber cut groups, a vector indicating links at a first half of the fiber cut groups on one of the two disjoint routes, a vector indicating links at a second half of the fiber cut groups on the other one of the two disjoint routes; and computing a vector of all dual link failures protected by the secondary backup path using the vector of fiber cut groups, the vector indicating links at a first half of the fiber cut groups, and the vector indicating links at a second half of the fiber cut groups.

11. The method of claim 10 further computing:

for each secondary backup path of the secondary backup paths, removing the secondary backup path; and computing a SPM for all the remaining secondary backup paths using the vector of all dual link failures protected by each of the remaining secondary backup paths.

12. The method of claim 11 further comprising computing an incremental link spare capacity vector using the computed the SPM for all the remaining secondary backup paths.

13. The method of claim 12 further comprising computing an alternative secondary backup path for the removed secondary backup path using the incremental link spare capacity vector.

14. The method of claim 12 further comprising:

updating the SPM for all the secondary backup paths including the alternative secondary backup path; and computing a SCA vector by selecting a maximum value element from each row of the SPM.

15. The method of claim 14 further including:

upon determining to continue an additional iteration of the SSR algorithm, updating the incremental link spare capacity vector using the updated SPM;

computing a new alternative secondary backup path for the removed secondary backup path using the incremental link spare capacity vector;

update the SPM for all the remaining secondary backup paths; and updating the SCA vector according to the updated SPM.

16. An apparatus for allocating shared spare resource capacity for a flow on two disjoint routes between two end nodes, comprising:

a processor; and a computer readable storage medium storing programming for execution by the processor, the programming including instructions to:

assign to the flow a working path on one of the two disjoint routes and a primary backup path on the other one of the two disjoint routes; and assign a plurality of partially disjoint backup paths to the flow that each passes through one fiber cut group on one of the two disjoint routes and through all remaining fiber cut groups on the other one of the two disjoint routes, wherein each of the fiber cut groups includes all dual link failures that interrupt the flow on both disjoint routes.

17. The apparatus of claim 16, wherein the two end nodes are only connected by two disjoint routes.

18. The apparatus of claim 17, wherein the working path and the primary backup paths are mutually disjoints and include different nodes and links on the two disjoint routes, and wherein each of the partially disjoint backup paths shares nodes and links with both the working path and the primary backup path.

19. The apparatus of claim 17, wherein each of the partially disjoint backup paths shares nodes and links in only one fiber cut group with the working path.

20. The apparatus of claim 17, wherein the number of fiber cut groups is equal to a minimum number of partially disjoint backup paths that covers all possible dual link failures on the disjoint routes.

\* \* \* \* \*